United States Patent [19]

Kennedy et al.

[11] Patent Number: 5,659,291

[45] Date of Patent: Aug. 19, 1997

[54] KEY-IN-IGNITION LOCK REMINDER SYSTEM

[75] Inventors: John Francis Kennedy, Dearborn; Scott Owen Campbell, Canton; Michael Anthony Thomas, Grand Blanc, all of Mich.

[73] Assignee: Ford Motor Company, Dearborn, Mich.

[21] Appl. No.: 345,971

[22] Filed: Nov. 28, 1994

[51] Int. Cl.⁶ ........................................ B60Q 1/00
[52] U.S. Cl. ..................... 340/457; 70/263; 307/10.2; 340/426; 180/287
[58] Field of Search ........................ 340/457, 439, 340/438, 426, 430, 425.5; 307/10.2, 10.5, 10.6; 180/273, 287; 70/263

[56] References Cited

U.S. PATENT DOCUMENTS

| | | |
|---|---|---|
| 3,484,569 | 12/1969 | Euston . |
| 3,703,704 | 11/1972 | Schiesteri et al. . |
| 3,912,939 | 10/1975 | Quantz et al. ............ 307/10.6 |
| 4,040,007 | 8/1977 | Kuroki . |
| 4,141,332 | 2/1979 | Wyler . |

(List continued on next page.)

FOREIGN PATENT DOCUMENTS

| | | |
|---|---|---|
| 4240426 | 6/1994 | European Pat. Off. . |
| 0083640 | 6/1980 | Japan ........................ 340/457 |
| 2 158 870 | 11/1985 | United Kingdom . |
| 2 174 452 | 11/1986 | United Kingdom . |
| WO88/03594 | 5/1988 | WIPO . |

Primary Examiner—Brent A. Swarthout
Attorney, Agent, or Firm—Roger L. May

[57] ABSTRACT

A key-in-ignition lock reminder system uses a key having a transponder with an identification code. An ignition lock for receiving the key has an adjacent antenna. A door proximity switch connected to the door generates a door open signal when the door is open. A control module is connected to a door lock control, the door proximity switch and a memory storing at least one identification code. The control module energizes the antenna coil which energizes a transponder. The transponder then transmits an identification code which is received by the antenna. The control module generates a control signal if the code from the transponder is equivalent to an identification code stored in the memory and the door proximity switch indicates the door is open. An indicator connected to the control module receives the control signal and generates an indication that the key is in the ignition lock.

11 Claims, 3 Drawing Sheets

U.S. PATENT DOCUMENTS

| | | | |
|---|---|---|---|
| 4,223,296 | 9/1980 | Kim et al. | |
| 4,240,516 | 12/1980 | Henderson et al. | |
| 4,250,533 | 2/1981 | Nelson | |
| 4,354,189 | 10/1982 | Lemelson | |
| 4,414,831 | 11/1983 | Perkut | |
| 4,428,024 | 1/1984 | Mochida et al. | |
| 4,438,426 | 3/1984 | Adkins | |
| 4,572,320 | 2/1986 | Robbins, Jr. | 180/289 |
| 4,663,952 | 5/1987 | Gelhard | |
| 4,670,746 | 6/1987 | Taniguchi et al. | 180/287 |
| 4,709,777 | 12/1987 | Metz | 180/286 |
| 4,738,334 | 4/1988 | Weishaupt | 340/426 |
| 4,779,090 | 10/1988 | Micznik et al. | 340/825.69 |
| 4,789,851 | 12/1988 | Hock et al. | 180/286 |
| 4,849,749 | 7/1989 | Fukamachi et al. | 340/825.31 |
| 4,862,139 | 8/1989 | Fukamachi et al. | 340/426 |
| 4,868,409 | 9/1989 | Tanaka et al. | 307/10.5 |
| 4,897,632 | 1/1990 | Hock et al. | 340/457 |
| 4,918,955 | 4/1990 | Kimura et al. | 70/277 |
| 4,924,686 | 5/1990 | Vonlanthen | 70/277 |
| 4,926,160 | 5/1990 | Hwang | 340/426 |
| 4,936,896 | 6/1990 | Takatsuka | 70/432 |
| 4,942,747 | 7/1990 | Pinnow | 70/277 |
| 4,983,948 | 1/1991 | Sunami | 340/426 |
| 5,003,801 | 4/1991 | Stinar et al. | 70/278 |
| 5,019,812 | 5/1991 | Gostahagberg et al. | 340/542 |
| 5,059,746 | 10/1991 | Hayes et al. | |
| 5,066,941 | 11/1991 | Lau | 340/457 |
| 5,079,435 | 1/1992 | Tanaka | 307/10.2 |
| 5,086,288 | 2/1992 | Stramer | 340/426 |
| 5,113,174 | 5/1992 | Wake | 340/457 |
| 5,113,182 | 5/1992 | Suman et al. | 340/426 |
| 5,117,097 | 5/1992 | Kimura et al. | 235/439 |
| 5,124,565 | 6/1992 | Yoshida et al. | 340/427 |
| 5,146,215 | 9/1992 | Drori | 340/825.32 |
| 5,156,032 | 10/1992 | Edgar | 340/825.31 |
| 5,195,341 | 3/1993 | Neieuwkoop | 70/278 |
| 5,202,580 | 4/1993 | Janssen | 307/10.3 |
| 5,237,165 | 8/1993 | Tingley, III | 235/492 |
| 5,254,842 | 10/1993 | Posner et al. | 307/10.2 |
| 5,278,547 | 1/1994 | Suman et al. | 340/426 |
| 5,287,098 | 2/1994 | Janssen | 340/825.31 |
| 5,289,177 | 2/1994 | Wake | 340/825.31 |
| 5,438,311 | 8/1995 | Lane, Sr. | 340/430 |
| 5,438,312 | 8/1995 | Lewis | 340/457 |
| 5,451,928 | 9/1995 | Cody | 340/457 |
| 5,461,386 | 10/1995 | Knebelkamp | 342/44 |

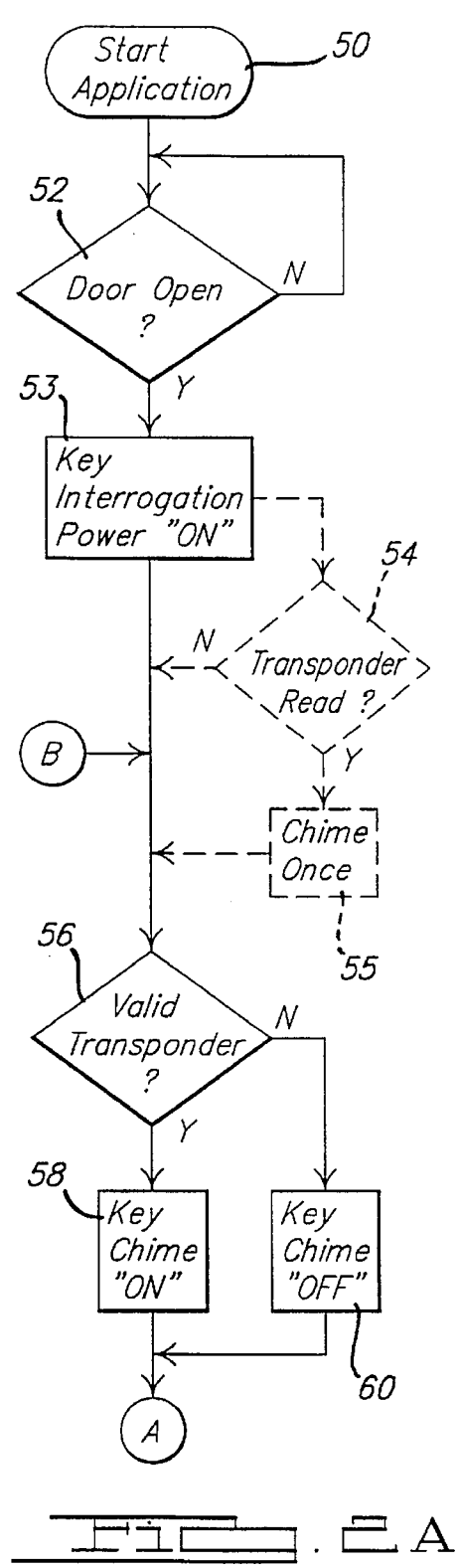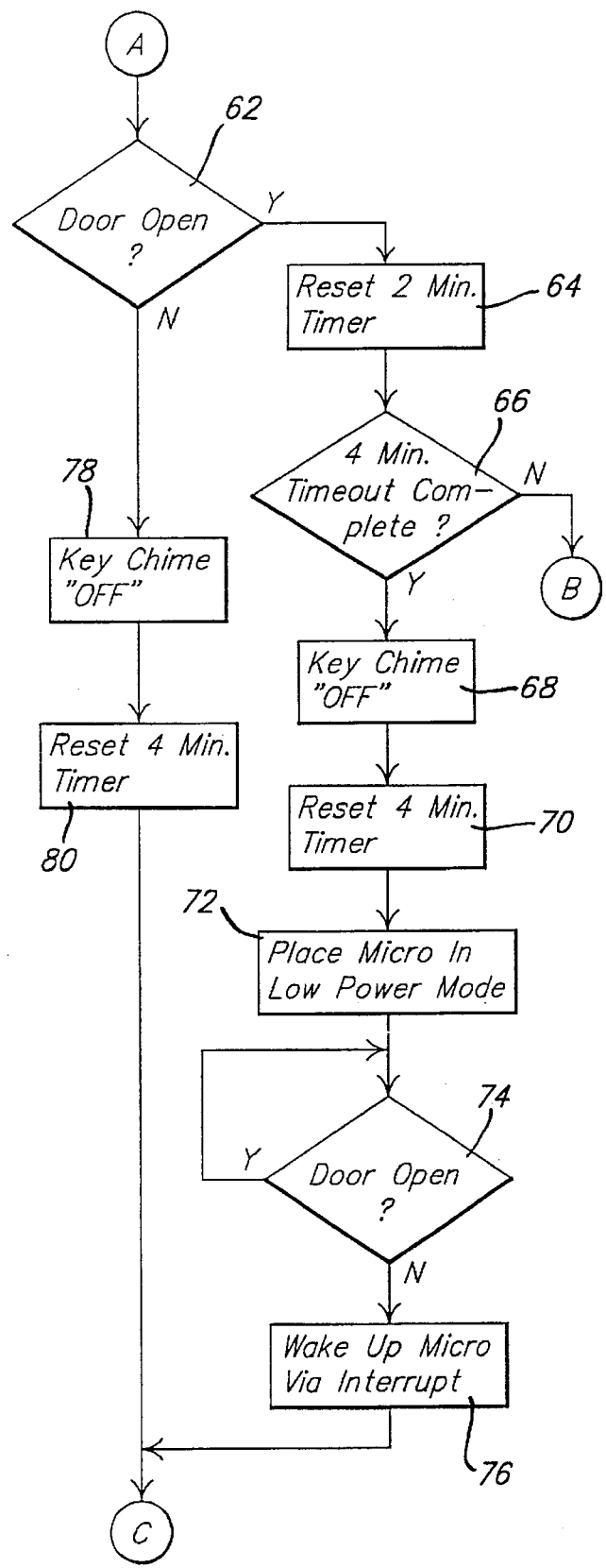
FIG. 2A.
FIG. 2B.

KEY-IN-IGNITION LOCK REMINDER SYSTEM

BACKGROUND OF THE INVENTION

The present invention relates to an apparatus for monitoring an ignition lock and doors and warning the vehicle operator if it appears that he may be leaving an ignition key in the ignition lock while exiting the vehicle.

Many automotive vehicles provide the vehicle operator with an audible key chime to remind him that the ignition key has been left in the ignition when his door is open. In vehicles employing such a system, a mechanical contact physically touches the key to determine if the key is still in the ignition lock.

One disadvantage of present implementations of key-in-ignition sensing is that the mechanical contact employed has a high failure rate due to oxidation of the contacts. Another disadvantage is the increased complexity of an ignition switch which incorporating the mechanical key-in-ignition contact and its associated wiring.

Some vehicles have anti-theft systems using a transponder carried on a key to identify that an unauthorized key has been placed in the ignition before allowing a vehicle to start. One disadvantage of such systems is that if the engine does not start, the operator does not know whether it is the engine or the anti-theft system that is malfunctioning.

It would therefore be desirable to eliminate the mechanical key-in-ignition mechanical switch and still provide the function of a key-in-ignition warning system.

SUMMARY OF THE INVENTION

The key-in-ignition reminder system uses some existing hardware present in a vehicle anti-theft system. One advantage of the present invention is that when the key-in-ignition reminder system is incorporated into a vehicle having an anti-theft system, the operator is able to distinguish the improper functioning of the anti-theft system from the improper functioning of the engine, because the key chime will sound if a key having a proper identification code is present.

Another advantage of the present invention is that since a door switch controls an interrogation function of the key-in ignition system, there is no delay associated with the anti-theft unit waiting to engage the vehicle to a start mode before engine cranking. This improves the vehicle operator's perception of the system since there is no delay in waiting for the interrogation system to stabilize before engine cranking.

The present invention includes a key having a transponder with an identification code. An ignition lock for receiving the key has an adjacent antenna. A door proximity switch connected to the door generates a door open signal when the door is open. A control module is connected to a door lock control, the door proximity switch and a memory storing at least one identification code. The control module energizes the antenna coil which energizes a transponder. The transponder then transmits an identification code which is received by the antenna. The control module generates a control signal if the code from the transponder is equivalent to an identification code stored in the memory and the door proximity switch indicates the door is open. An indicator connected to the control module receives the control signal and generates an indication that the key is in the ignition lock.

BRIEF DESCRIPTION OF THE DRAWINGS

FIGS. 2a to 2d is a flowchart of the operation of the system.

DETAILED DESCRIPTION OF THE PREFERRED EMBODIMENT

Figure 1:
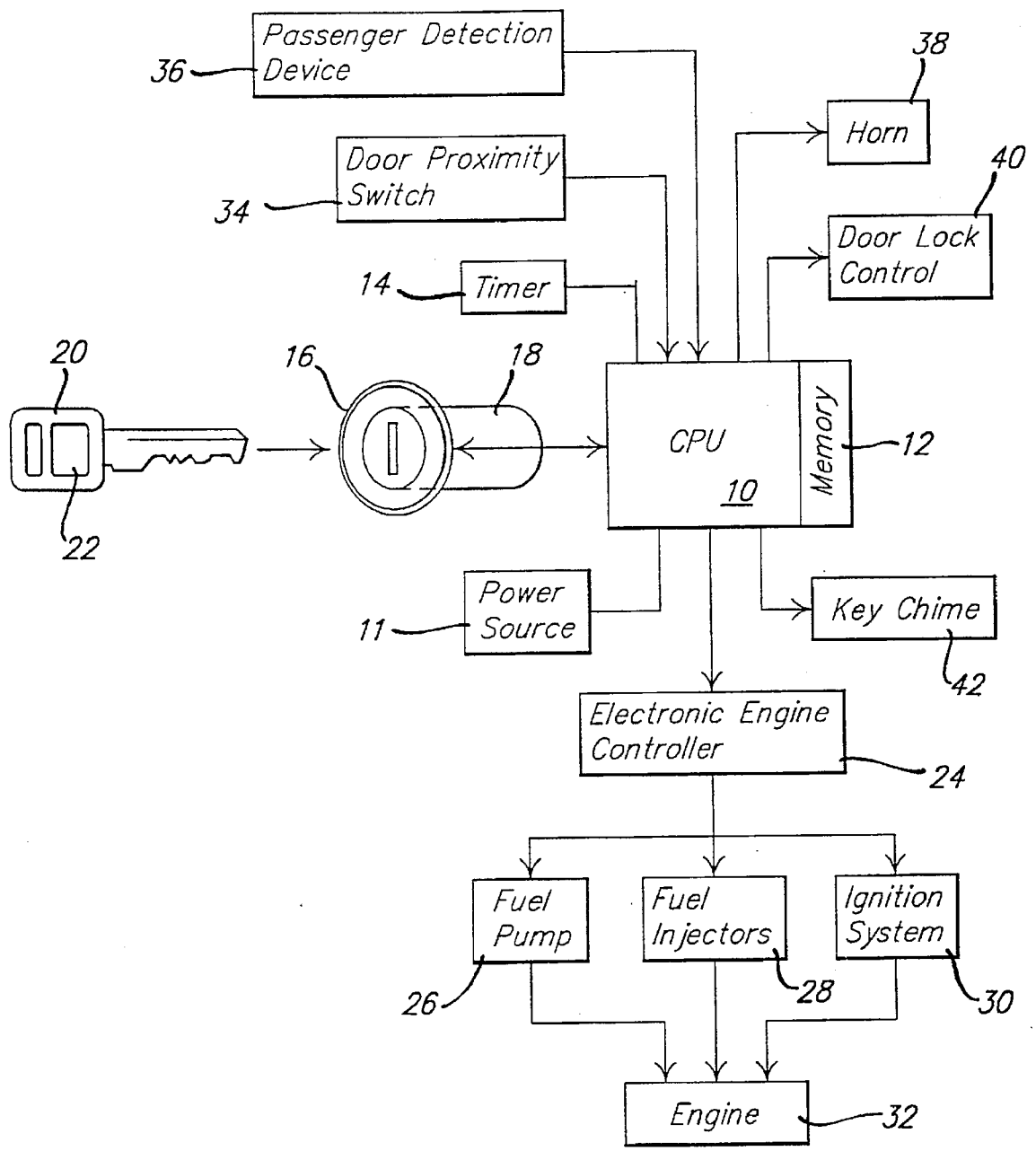
FIG. 1 is a block diagram of the key-in-ignition system according to the present invention.
Figure 2C:
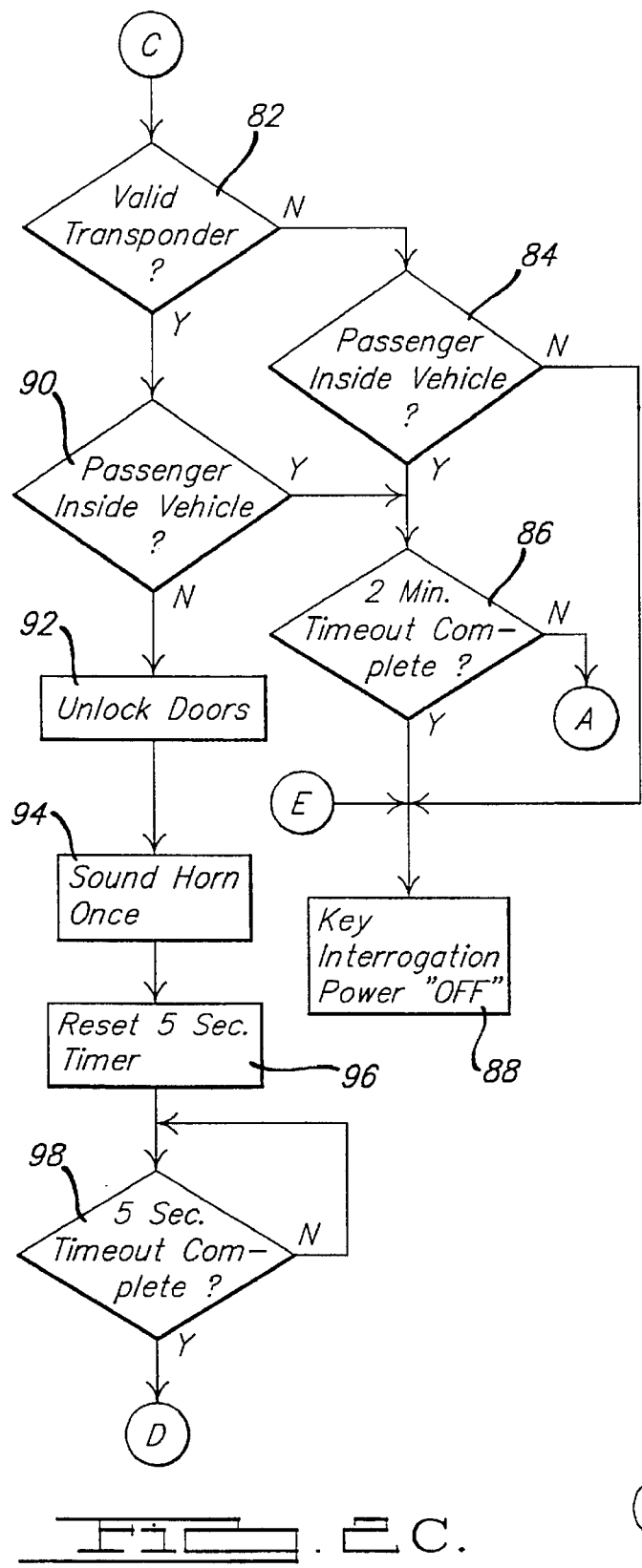
Figure 2D:
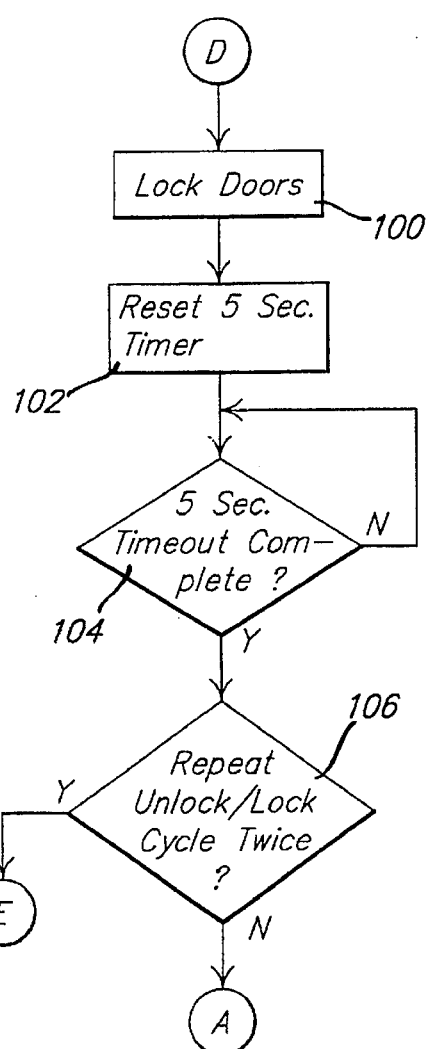

Referring to FIG. 1, the central control module of the system is a CPU 10. CPU 10 may be either a dedicated CPU or more preferably a shared CPU with another function such as an anti-theft system. CPU 10 is powered by a power source 11 which is preferably a regulated derivative of the battery voltage of an automotive vehicle. CPU 10 is connected to a memory 12 which stores at least one code which signifies a valid identification code to operate the system. CPU 10 also includes a timer 14 which is preferably a series of timers capable of timing several events simultaneously and independently.

CPU 10 has an input and output connected to antenna 16 and its associated transmitting and receiving circuitry (not shown) which is placed in close proximity to ignition lock 18. As shown, antenna 16 is placed around ignition lock 18. A key 20 cut to operate ignition lock 18 has a transponder 22 mounted thereon which upon energization by RF coupling induction generates an RF identification code. CPU 10 generates an output signal to antenna 16 which in turn transmits sufficient power to permit transponder 22 to generate a identification code in response thereto when transponder 22 is in close proximity to antenna 16. Antenna 16 receives the identification code generated by transponder 22 and transmits the information to CPU 10 for processing.

As shown these elements are part of a security system which, for example, is connected to an electronic engine controller 24. In such a system, the received identification code from transponder 22 is compared with the codes stored in memory 12. If a match occurs, electronic engine controller 24 enables fuel pump 26, fuel injectors 28 and ignition system 30 so that engine 32 operates. In such systems, the rotation of the key in the ignition lock typically initiates interrogation of the transponder as described above. The interrogation can also occur prior to the rotation of the key, e.g., during the insertion of the key into the lock.

Other inputs to CPU 10 include a door proximity switch 34 and a passenger detection device 36. Other outputs from CPU 10 are connected to a horn 38, a door lock control 40, and a key reminder chime 42.

Door proximity switch 34 is connected to at least one door preferably the driver side door of an automotive vehicle. Door proximity switch 34 generates a signal in response to whether the door of the automotive vehicle is open or closed.

Passenger detection device 36 is placed within the passenger compartment of the automotive vehicle. Passenger detection device 36 may be a variety of detection devices such as an infrared detector, microwave detector, optical sensor, or seat load detection device. Passenger detection device 36 must be capable of reliably distinguishing the presence of a passenger within the passenger compartment of the automotive vehicle under the extreme conditions to which a vehicle is subject.

Horn 38 is preferably the horn existing in the automotive vehicle. CPU 10 has the capability to control the sounding of horn 38 in a conventional manner directly or through a relay or the like.

CPU 10 has the capability of controlling the locking and unlocking of the doors through door lock control 40 by generating a lock control signal.

Chime 42 is a conventional chime typically found inside the passenger compartment of many automobiles which is used to audibly alert the vehicle operator of such things as the keys left in the ignition or headlights on. Although the chime is described in terms of an audible chime, one skilled in the art would recognize a warning light may also be included in conjunction with or in place of the audible chime.

As will be described in further detail below, the system generally operates as follows. When the vehicle door is opened, the system constantly interrogates antenna 16 to determine if a transponder on a key is present in ignition lock 18. The key chime is sounded as long as the vehicle door is open and the key is in the ignition lock, thus preventing the operator from locking the keys in the automotive vehicle. If the vehicle operator inadvertently exits the vehicle and closes the door while leaving the keys in the ignition lock, CPU 10 will sound horn 38 to alert the driver and then unlock the door to allow the vehicle operator to retrieve the keys.

In operation, the preferred method of operating the key-in-ignition reminder system is shown in FIGS. 2a through 2d. The system may be operated as a stand alone process or as part of an interrupt routine used by a shared CPU. The key-in-ignition routine starts in step 50. In step 52, the CPU monitors the state of the door proximity switch or the door switch can be used to wake the CPU. If the door proximity switch indicates the door is open, the key interrogation system is operated in step 53. By providing sufficient power to energize a transponder, the CPU interrogates and waits for a response from a transponder. If the transponder key code matches one stored in the memory of the CPU, it is a valid transponder. In step 56, if the key has a valid transponder, the key chime is turned on in step 58 to warn the driver not to leave his keys in the vehicle. If the key does not have a valid transponder, the key chime is not started as in step 60.

As optional steps, steps 54 and 55 are added after step 53. If any transponder having code in the proper format is read in step 54, regardless of whether it is valid or not, a key chime will sound in step 55. This option further delays the time it would take to bypass the system by not indicating so readily whether a valid key is present.

The state of the door proximity switch is then again monitored in step 62. If the door is open, a two minute timer is reset. The two minute timer as shown is optional and is started if the door is closed and the key is in the ignition. The initialization of two minute timer is further described below.

A four minute timer will allow the key chime to operate for only four minutes as a battery saving feature. This feature is optional and is useful if for example the door proximity switch malfunctions or while servicing the vehicle. The status of four minute timer is checked in step 66. If the four minute timer has not completed counting, the system cycles back to step 56. If the four minute timer has completed counting, i.e., the key chime has been on for four minutes, the key chime is turned off in step 68. The four minute timer is reset in step 70. The CPU is then placed in low power mode 72 to conserve energy. The state of the door proximity switch is monitored in step 74. If the door is open (i.e., remains open), step 74 will be repeated until the door is closed. If the door is closed or the key is rotated in the ignition lock the CPU will wake from low power mode and enter full operating state in step 76.

Referring back to step 62, if the door is not open the key chime is turned off in step 78 and the four minute battery saving timer is reset in step 80.

In addition to the preceding key-in-ignition reminder system, the following steps may be added to form an anti-lockout function. Step 82 again checks if there is a valid transponder present. If a valid transponder is not present, step 84 checks if a passenger is present within the vehicle. If a passenger is within the vehicle, the status of the two minute timer is checked in step 86. If less than two minutes have passed the sequence continues at step 62. If more than two minutes have been counted by the two minute timer, the key interrogation system is turned off in step 88. If no passenger is detected within the vehicle step 84, then the key interrogation system is turned off in step 88.

Referring back to step 82, if a valid transponder was found then step 90 checks for the presence of a passenger inside the vehicle. If a passenger is still in the vehicle, step 86 is executed as described above. If no passenger is within the vehicle, the vehicle doors are unlocked in step 92. This branch is performed if the operator has left his keys in the ignition and he has locked the keys inside the vehicle. The horn is sounded in step 94 and a five second timer is reset to zero in step 96.

At step 98 the system will wait until five seconds has elapsed in continuing with the sequence. This gives the vehicle operator time to return to the vehicle and open a door to retrieve the key. After the doors have been unlocked for five seconds, the doors are re-locked in step 100 and the five second timer is reset in step 102. The sequence continues in step 104 where the system pauses for another five seconds. It is preferred that the lock/relock sequence is performed at least two or three times to ensure adequate time for the vehicle operator to return to the vehicle and retrieve his keys. In step 106, if the lock/relock sequence has been executed the desired amount of times, step 88 is executed and the key interrogation system is powered off. If in step 106, the desired number of lock/relock cycles have not been performed the sequence is returned to step 62.

Various modifications will be apparent to those skilled in the art. For example, various methods of powering the key interrogation system, the length of the timing sequences, and the various feedback to the driver such as indicator lights and or audible chimes can all be varied without deviating from the scope of the invention.

What is claimed is:

1. A key-in-ignition reminder apparatus for an automotive vehicle having at least one door comprising:

a key;

a transponder mounted in said key having an identification code;

an ignition lock for receiving said key;

an antenna located adjacent said ignition lock;

a door proximity switch connected to said door generating a door open signal when said door is open;

a memory storing at least one identification code;

a door lock control for controlling a lock on said door;

passenger detection means for detecting the presence of a passenger within a passenger compartment of said vehicle;

a control module connected to said passenger detection means, said door lock control, said door proximity switch and said memory, said control module energizing said antenna and receiving said identification code if said key is located in said ignition lock, said control module generating a control signal if said identification code is received from said transponder and said door open signal is received, and wherein said control module causes said door lock control i) to unlock said door if said door open signal is no longer received while said identification code is still received and no passenger is detected within the passenger compartment and said door is locked and ii) to relock said door after a predetermined time; and indicator means connected to said control module for receiving said control signal and generating an indication that said key is in said ignition lock.

2. A key-in-ignition reminder apparatus as recited in claim 1 wherein said indicator means is audible.

3. A key-in-ignition reminder apparatus as recited in claim 1 further comprising a timer connected to said control module, said control module generating said control signal for a predetermined amount of time as counted by said timer.

4. A key-in-ignition reminder apparatus as recited in claim 1 further comprising a horn wherein said control module sounds said horn upon unlocking said door.

5. A key in-ignition reminder apparatus as recited in claim 1 wherein said passenger detection means comprises a microwave detector.

6. A method for reminding an automotive vehicle operator that an ignition key for an ignition switch of an automotive vehicle has been left within the ignition switch, said automotive vehicle having a door with a proximity switch for indicating whether the door is open or closed, the method comprising the steps of:

powering a control unit in response to opening the door;

inserting a key in said ignition lock;

energizing an antenna located in close proximity to said ignition lock while said door is open through said control unit;

emitting an identification code from said key; generating feedback to said control module if said identification code is in the proper format and said door remains open;

closing the door;

sensing whether a person is present within the vehicle;

if a person is not present in the vehicle and the doors are locked then;

generating feedback;

unlocking said door for a predetermined period; and relocking said door if the door is not reopened within a predetermined time period.

7. A method as claimed in claim 6 wherein said step of generating said proper format is said identification code stored within a memory.

8. A method as claimed in claim 6 wherein said predetermined time is 5 seconds.

9. A method as recited in claim 6 wherein said steps of unlocking and locking are repeated three times.

10. A key-in-ignition reminder apparatus for an automotive vehicle having at least one door, wherein a key having an integrally mounted RF transponder is required to operate said automotive vehicle, and wherein said RF transponder is energized by an energizing signal to transmit an identification code, said apparatus comprising:

an ignition lock for receiving said key;

an antenna located adjacent said ignition lock for transmitting said energizing signal and receiving said identification code;

a door proximity switch connected to the door generating a door open signal when said door is open;

a control module connected to said door proximity switch and said antenna, said control module causing said energizing signal to be transmitted in response to said door open signal, said control module attempting to receive said identification code after transmitting said energizing signal, and said control module generating a control signal if said identification code is received and matches an authorized code stored within said vehicle; and indicator means connected to said control module for receiving said control signal and generating an indication that said key is in said ignition lock.

11. A key-in-ignition reminder apparatus for an automotive vehicle having at least one door, wherein a key having an integrally mounted RF transponder is required to operate said automotive vehicle, and wherein said RF transponder is energized by an energizing signal to transmit an identification code according to a predetermined format, said apparatus comprising:

an ignition lock for receiving said key;

an antenna located adjacent said ignition lock for transmitting said energizing signal and receiving said identification code;

a door proximity switch connected to the door generating a door open signal when said door is open;

a control module connected to said door proximity switch and said antenna, said control module causing said energizing signal to be transmitted in response to said door open signal, said control module attempting to receive said identification code after transmitting said energizing signal, and said control module generating a control signal if an identification code is received in said predetermined format; and indicator means connected to said control module for receiving said control signal and generating an indication that said key is in said ignition lock.

\* \* \* \* \*